(12) United States Patent
Ji et al.

(10) Patent No.: US 7,467,297 B2
(45) Date of Patent: Dec. 16, 2008

(54) APPARATUS OF A FLEXIBLE AND COMMON IPMP SYSTEM FOR MPEG-2 CONTENT DISTRIBUTION AND PROTECTION

(75) Inventors: Ming Ji, Singapore (SG); Sheng Mei Shen, Singapore (SG); Zhongyang Huang, Singapore (SG); Takanori Senoh, Hirakata (JP)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 10/399,049

(22) PCT Filed: Aug. 30, 2002

(86) PCT No.: PCT/JP02/08780

§ 371 (c)(1),
(2), (4) Date: Apr. 18, 2003

(87) PCT Pub. No.: WO03/021965

PCT Pub. Date: Mar. 13, 2003

(65) Prior Publication Data

US 2004/0054892 A1    Mar. 18, 2004

(51) Int. Cl.
*H04L 9/00* (2006.01)
*H04N 7/167* (2006.01)

(52) U.S. Cl. .................... 713/164; 380/217
(58) Field of Classification Search .......... 380/217; 713/164
See application file for complete search history.

(56) References Cited

U.S. PATENT DOCUMENTS 5,144,665 A    9/1992    Takaragi et al.

6,353,892 B2    3/2002    Schreiber et al.

(Continued)

FOREIGN PATENT DOCUMENTS

EP    0766471    4/1997

(Continued)

OTHER PUBLICATIONS

B.J. Van Rijnsoever et al., Interoperable Content Protection for Digital TV, which was published on Jul. 30, 2000.

(Continued)

*Primary Examiner*—Kambiz Zand
*Assistant Examiner*—Aubrey H Wyszynski
(74) *Attorney, Agent, or Firm*—Greenblum & Bernstein, P.L.C.

(57) ABSTRACT

An apparatus of a flexible and common MPEG-2 IPMP system (Intellectual Property Management and Protection) is invented to provide flexibility and interoperability by introducing a IPMP Control Information which includes IPMP Tool List and an optional Tool Container. The IPMP Control Information is put in PSI in MPEG-2 transport stream, and a special PES packet in MPEG-2 program stream. IPMP Stream is defined to carry IPMP information that is to be sent to each individual IPMP tool instance. The concept of Tool Manager, Message Router from MPEG-4 IPMP extension is mapped into MPEG-2 terminal to form MPEG-2 IPMP framework together with introduced IPMP Control Information and IPMP Stream. As a result of this invention, the same protected MPEG-2 content is able to play back by different types of MPEG-2 IPMP terminals, and the same MPEG-2 content can be protected by using different vendors' IPMP system.

22 Claims, 3 Drawing Sheets

U.S. PATENT DOCUMENTS

| | | | |
|---|---|---|---|
| 6,421,359 B1 * | 7/2002 | Bennett et al. | 370/538 |
| 6,535,919 B1 | 3/2003 | Inoue et al. | |
| 7,099,491 B2 * | 8/2006 | Takaku | 382/100 |
| 7,233,948 B1 * | 6/2007 | Shamoon et al. | 707/9 |
| 2001/0033660 A1 * | 10/2001 | Maeda | 380/232 |
| 2001/0053222 A1 | 12/2001 | Wakao et al. | |
| 2002/0035725 A1 * | 3/2002 | Ando | 725/32 |
| 2003/0149890 A1 | 8/2003 | Shen et al. | |
| 2004/0236956 A1 * | 11/2004 | Shen et al. | 713/193 |

FOREIGN PATENT DOCUMENTS

| | | |
|---|---|---|
| EP | 0913997 | 5/1999 |
| EP | 0957606 | 11/1999 |
| EP | 0969668 | 1/2000 |
| EP | 1041819 | 10/2000 |
| EP | 1079627 | 2/2001 |
| JP | 8-331543 | 12/1996 |
| JP | 10-51778 | 2/1998 |
| JP | 10-51779 | 2/1998 |
| JP | 10-257046 | 9/1998 |
| JP | 10257046 | 9/1998 |
| JP | 11331310 | 11/1999 |
| JP | 2000-83022 | 3/2000 |
| JP | 2000-083022 | 3/2000 |
| JP | 2000-101853 | 4/2000 |
| JP | 2000-287206 | 10/2000 |
| JP | 2001-78007 | 3/2001 |
| JP | 2001-359070 | 12/2001 |
| WO | 99/48296 | 9/1999 |
| WO | 01/91052 | 11/2001 |
| WO | 02/071752 | 12/2002 |
| WO | 02/100037 | 12/2002 |

OTHER PUBLICATIONS

"DVB: Call for Proposals for Content Protection and Copy Management Technologies," which was downloaded from www.cptwg.org/Assets/DVB-CPT-CfP_rev1.2.PDF on Feb. 10, 2003.

R. Koenen, "Intellectual Property Management and Protection in MPEG Standards," which was downloaded from www.cselt.it/mpeg/standards/ipmp on Sep. 24, 2001.

English Language Abstract of JP 2000-83022.
English Language Abstract of JP 2000-287206.
English Language Abstract of JP 10-257046.
Electronics, No. 554, Nippon, Chumu Sha, Jul. 1, 2000, pp. 51-54.
English Language Abstract of JP 11-331310.
English Language Abstract of JP 8-331543.
English Language Abstract of JP 2000-101853.
English Language Abstract of JP 10-51778.
English Language Abstract of JP 10-51779.
English Language Abstract of JP 2001-78007.
English Language Abstract of JP 2001-359070.
English Language Abstract of JP 2000-083022.

* cited by examiner

APPARATUS OF A FLEXIBLE AND COMMON IPMP SYSTEM FOR MPEG-2 CONTENT DISTRIBUTION AND PROTECTION

TECHNICAL FIELD

The present invention relates to content distribution and protection in MPEG-2 scope, especially to such applications where the protected content based on MPEG-2 is consumed by different IPMP terminal, and the same content is protected by different IPMP system.

BACKGROUND ART

Content distribution is becoming more and more demanding as multimedia data and contents can reach anywhere and anytime. Users are happy with the convenience and flexibility, and they can enjoy entertainment easily and efficiently. On the other hand, content owners are worried about the illegal usage of their property. There is a balance between two sides.

There are a lot of protection techniques for protecting the content, such as data encryption, watermarking, etc. They have been implemented in many content distribution applications. It seems different system employs different kinds of mechanisms and protection techniques to distribute content with protection. All the terminals or content consuming devices in that case are only able to play and consume the content that is provided by the same content provider. They cannot exchange their terminal or device to playback different contents.

In MPEG-4 context, a standardisation group has been working on MPEG-4 IPMP Extension. The solution is able to achieve both of the following:
1. Allow the same protected content to be consumed on different vendors' MPEG-4 IPMP Terminals. This will be fully enabled.
2. Allow the same content to be protected by different vendors' IPMP Tools. This will be assisted to as large extent as possible.

In MPEG-2 context, there is a CA (Conditional Access) system that defines a minimum set of common CA elements necessary to achieve interoperability between different CA systems. However, there is no real inter-operability here, as not enough components are defined, and the architecture offered by CA is not flexible enough.

It is very difficult to produce the same terminal to play different MPEG-2 contents provided by different content providers in such case. In other words the same protected MPEG-2 content cannot be played back in different CA system.

On the other hand, CA system defines a common scrambling algorithm, this makes hardware implementation simple, however, this makes the whole architecture too rigid. IPMP tool should not be fixed to certain tool beforehand, it should allow more flexibility for vendors to choose their favourite tool in their IPMP system. In such case it is necessary to define some standard way and interface to provide both better flexibility and security at the same time.

Hence, a flexible and interoperable IPMP system is needed in MPEG-2 system for content protection.

To define a flexible and interoperable IPMP system structure for MPEG-2 to allow:
1. The same protected MPEG-2 content to be consumed on different vendors' MPEG-2 IPMP Terminals. This will be fully enabled.
2. The same MPEG-2 content to be protected by different vendors' IPMP Tools. This will be assisted to as large extent as possible.

To provide the standard way for IPMP system implementers to build the whole IPMP system for MPEG-2 from encoder, channel distribution, to terminal in a secure manner;

DISCLOSURE OF INVENTION

To solve the problem, MPEG-4 IPMP Extension can be mapped to MPEG-2 with some modifications.

IPMP Control Information needs to put inside the content to describe what are the IPMP tools needed to play the content, and how they protect the content. It includes IPMP Tool List and IPMP Tool Container.

The IPMP Tool List supports indication of independent or alternative Tools. For each tool in the IPMP Tool List, the following information is provided:
1. IPMP Tool Identifier: A given IPMP tool is identified to other entities via its IPMP Tool Identifier, and an optional Parametric Description;
2. Possible alternatives to a given Tool; and
3. Optional Tool List Signature.

The IPMP Tool Container carries the binary tool itself in the content. One implementation of a given tool is carried as the payload of one IPMP Tool Container, the representation format, packaging information and IPMP Tool ID of which is specified in the container also.

IPMP Control Graph describes the association between different elementary streams under different programs and different IPMP tools, at the control point at which the IPMP tool should be running.

The IPMP Tool Manager is a conceptual entity in a given IPMP Terminal. Upon receipt of the Tool List, the Terminal should route the same to the IPMP Tool Manager for parsing and Tool retrieval. The Tool Manager also processes parametric descriptions, resolves alternative tools, and receives binary Tools that arrive in the Content.

All IPMP Tool Messages are routed through the Terminal. To represent this function, an entity called the Message Router (MR) is defined in the architecture. The MR connects and communicates with supported IPMP Tool(s). It thus abstracts the physical interface of one IPMP Tool from any other IPMP Tool that wishes to communicate with it. Message Routing is assumed to be instantaneous.

OPERATION OF INVENTION

On the content provider side, a media content is encoded using existing coding technology like MPEG-2 or MPEG-4, and encrypted using existing IPMP tool like DES or AES. The content maybe embedded with watermarks using a Watermark Tool AAA (for example) before the encoding. The media content is then multiplexed using MPEG2 system.

At the same time, IPMP Control Information needs to be built up, that includes IPMP Tool List and an optional Tool Container. The IPMP Control Information is put in PSI in MPEG-2 transport stream, and a special PES packet in MPEG-2 program stream.

IPMP Tool List is also generated based on the IPMP Tools used in protecting the content. The IPMP Tools List includes IPMP Tool ID specifying a unique tool. It can also includes optional parametric description to allow the terminal to choose their own preferred tool that does the same function (for example, DES), and it may also includes a set of alternative tools so that the terminal can choose among a set of known tools that can accomplish the same task.

IPMP Control Graph is also built during content generation. For example, if DES tool is used to encrypt video elementary stream 0x01 after encoding, then, in the control graph, there needs to be an indication that DES tool is used to protect elementary stream 0x01, and it should be called at which control point (before decoding). If Watermark Tool AAA is used to insert watermark into audio elementary stream 0x02 before encoding, then, in the control graph, there needs to be an indication that Watermark Tool AAA needs to be called upon elementary stream 0x02 at which control point (after decoding).

On the terminal side, IPMP Tools List is passed to the IPMP Tool Manager module sitting inside MPEG-2 terminal. The Tool Manager checks whether all tools needed to consume the content are present in the terminal, if there is one missing, the terminal follows a proprietary way to retrieve the missing IPMP Tool according to the IPMP Tool ID or parametric description. The obtained IPMP Tools are now available in the terminal, and they are stored in the IPMP terminal to be ready for use with the pre-defined messaging interface.

The IPMP Control Graph is also parsed by the terminal, so that the terminal knows which IPMP Tool to invoke upon which elementary stream at which control point.

The content stream is then continuing to pass through content decoder, necessary IPMP tools are called upon, and the content can be decoded and played back to the terminal.

EFFECTIVE OF INVENTION

This invention solves the problem to play back the same protected MPEG-2 content by different types of terminals, as well as to protect the same MPEG-2 content using different vendors' IPMP system, by introducing the MPEG-2 IPMP framework.

IPMP Control Information can be carried in PSI for MPEG-2 transport stream, or in PES packet for MPEG-2 program stream. The IPMP Control Information carries IPMP Tool List, or IPMP Tool Container in the form of five new descriptors.

The IPMP Tool List identifies, and enables selection of, the IPMP Tools required to process the Content. IPMP Control Graph indicates the association between IPMP tools and their protection scope (control point). Tool Container carries the binary tool in the content stream.

IPMP Stream is the elementary stream within MPEG-2 system, to carry IPMP messages to each individual IPMP tool instances.

IPMP Tool Manager and Message Router can be mapped from MPEG-4 IPMP Extension to MPEG-2 IPMP system.

BEST MODE FOR CARRYING OUT THE INVENTION

Existing CA system in MPEG-2 does not provide an interoperable and flexible content protection mechanism for both the content owners and terminal vendors.

Figure 1:
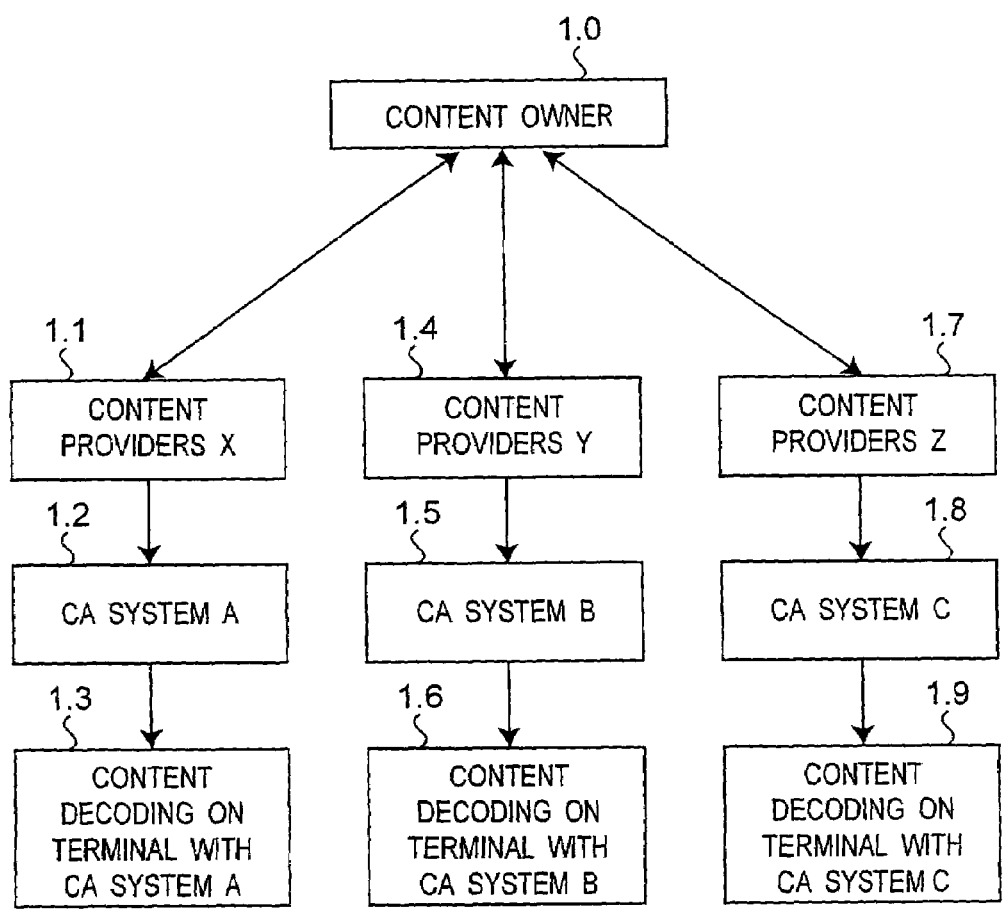
FIG. 1 shows Content Distribution and Protection in different CA System for MPEG-2 as the prior art.

The FIG. 1 shows the prior art for the current typical CA system.

Content Owner in unit 1.0 provides contents through different content providers X, Y, and Z in unit 1.1, 1.4, and 1.7. Different CA system is used to protect the content for different content provider as shown in unit 1.2, 1.5, 1.8.

Therefore Content Decoding or Content Consumption terminal is also different from each other, as shown in unit 1.3, 1.6, and 1.9.

It is clear that MPEG-2 content protected by CA system A can't be played out on terminals that support CA system B, also there is no complete specification on how different CA systems from different vendors are to protect the same content, and how the terminal gets to know that.

In this invention, we define a MPEG-2 IPMP system, 1) to carry IPMP Control Information including Tool List and Tool Container in the stream to indicate which IPMP Tools is used by content providers and content distributors, and how binary tool should be carried inside the content.

2) to define 5 new descriptors in MPEG-2 system to hold Tool List, IPMP Control Graph, IPMP Tool Container.

3) to define 2 new streams. IPMP Stream to carry IPMP information that is to be sent to each individual tool instance, and IPMP Control Information Stream to carry IPMP Control Information in Transport Stream.

4) to map the concept of Tool Manager, Message Router from MPEG-4 IPMP extension into MPEG-2 terminal.

Figure 2:
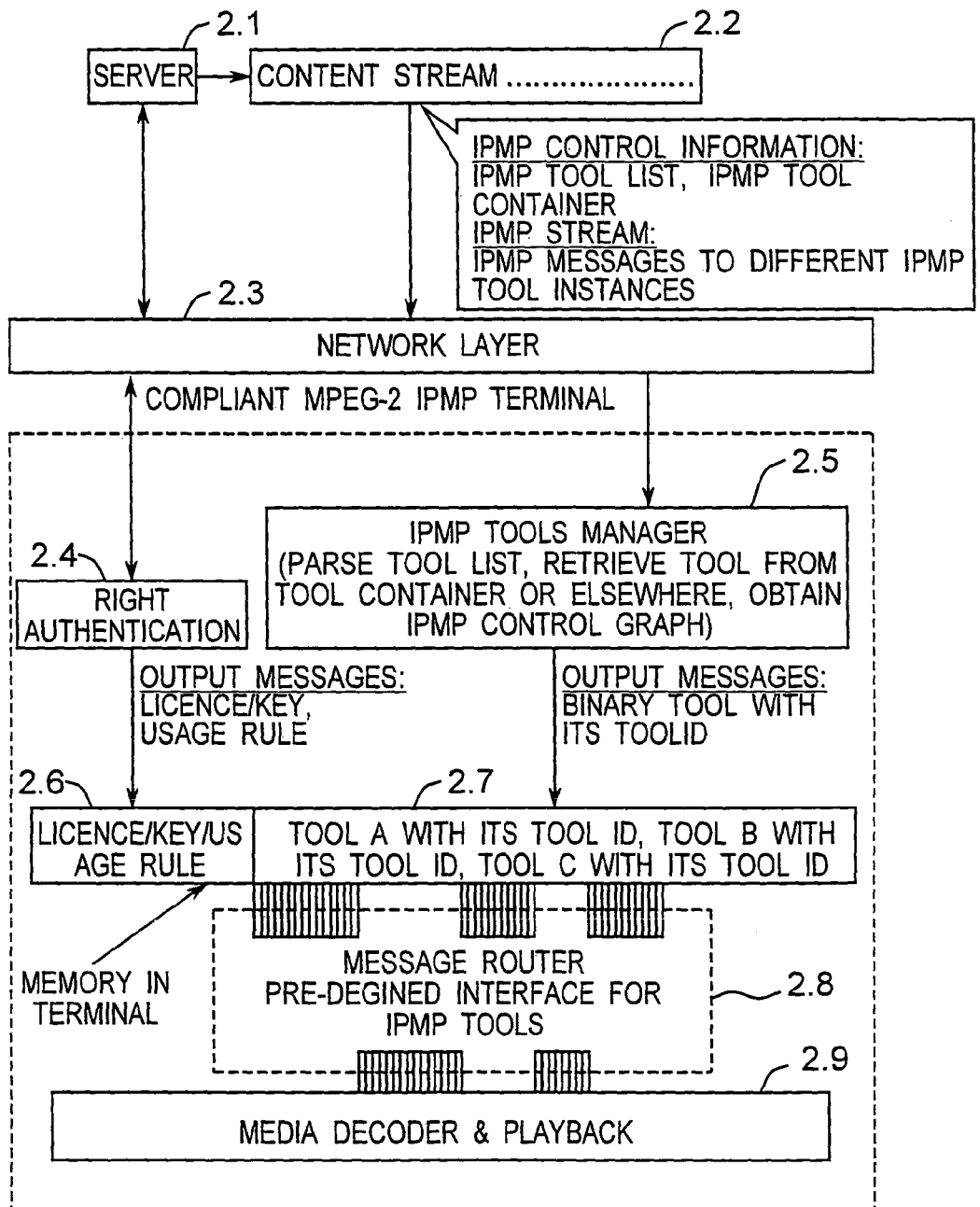
FIG. 2 shows General Diagram for a Compliant MPEG-2 IPMP System.

The general diagram in FIG. 2 is shown for our presented compliant MPEG-2 IPMP system.

Server is shown in module 2.1, it works as either Content Provider or Content distributor, or both functions for different application scenario.

Network layer is shown in module 2.3 for communication between Compliant MPEG-2 IPMP terminal and Server including transmission of content stream from the server to the terminal.

At first, Right Authentication in module 2.4 starts to interact with the server, to obtain the content access and consumption right, as well as the detail usage rule. If the right for content access is authorized in Module 2.4, the server will send the requested content stream to the terminal via the Network layer.

In module 2.2, Content stream is transmitted together with IPMP Control Information including Tool List and Tool Container, and IPMP Stream. The details of IPMP Control Information and IPMP Stream will be explained later.

IPMP Tools Manager shown in Module 2.5 is to parse/interpret IPMP Control Information. It parses the Tool List and finds out what are the IPMP tools needed to process the content. If there is any missing tool, the Tool Manager either retrieves the tool from the Tool Container or it retrieves the tool from somewhere else through a proprietary way. The Tool Manager is also responsible to select tool from a list of alternative choices, or to interpret the parametric description and choose its own favourite tool.

IPMP Tool Manager also parses the IPMP Control Graph to find out which tool is used upon which elementary stream at which control point. Details of this will be explained later.

The Licence/key, and Usage Rules are stored in the memory of the terminal as module 2.6 for further process. The binary IPMP Tools with their corresponding ToolIDs are stored in the memory of the terminal as module 2.7. Each of the Tools is built following the generic and standardised Interface and it is pre-compiled using the compiler for matching the platform. For example, the Tool of Data encryption and decryption can be built based on one generic and specified Interface. It can be pre-compiled into Java Byte Code (JBC) for all the platforms/terminals with Java Virtual Machine, and it is also can be pre-compiled into Dynamic Link Library (DLL) for Windows based platforms/terminals.

Module 2.8 shows the Messaging Interfaces of IPMP Tools that are needed to be pre-defined for IPMP Tool providers and Terminal implementers to follow.

The detail explanation is split into four parts here, to indicate each invented item.

(1. IPMP Control Information)

IPMP Control Information needs to be carried in the content stream. IPMP Control Information contains necessary information like Tool List and Tool Container. The IPMP Tool List identifies, and enables selection of, the IPMP Tools required to process the Content. Tool Container enables the carriage of binary tool in content streams.

In short, the IPMP Control Information describes what are the IPMP tools needed to play the content, and how they protect the content. In Transport stream, it exists in the form of IPMP Control Information table. In Program Stream, it exists in the form of a PES packet when the stream_id is IPMP Control Information Stream ID.

(1.1 IPMP Control Info Table in Transport Stream)

An additional table "IPMP Control Information Table" should be included in PSI (Program Specific Information). This is used to hold IPMP control information including Tool Container and IPMP Tool List Descriptor that will be defined later on. The PID assignment is illustrated as below.

TABLE 1

Program specific information

| Structure Name | Stream Type | Reserved PID # | Description |
| --- | --- | --- | --- |
| Program Association Table | ITU-T Rec. H.222.0\|ISO/IEC 13818-1 | 0x00 | Associates Program Number and Program Map Table PID |
| Program Map Table | ITU-T Rec. H.222.0\|ISO/IEC 13818-1 | Assigned in the PAT | Specifies PID values for components of one or more programs |
| Network Information Table | Private | Assigned in the PAT | Physical network parameters such as FDM frequencies, Transponder Numbers, etc. |
| IPMP Control Information Table | ITU-T Rec. H.222.0\|ISO/IEC 13818-1 | 0x03 | Contains IPMP Tool List to describe the IPMP tools and how they protect the content. |
| Conditional Access Table | ITU-T Rec. H.222.0\|ISO/IEC 13818-1 | 0x01 | Associates one or more (private) EMM streams each with a unique PID value |

(1.1.1 Mapping of IPMP Control Information Table into Sections)

The IPMP Control Information table may be segmented into one or more sections, before insertion into Transport Stream packets, with the following syntax.

TABLE 2

IPMP Control Information Table section

| Syntax | No. of bits | Mnemonic |
| --- | --- | --- |
| IPMP_Control_Info_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   reserved | 2 | bslbf |
|   ipmp_control_info_version | 5 | uimsbf |
|   current_next_indicator | 1 | bslbf |
|   section_number | 8 | uimsbf |
|   last_section_number | 8 | uimsbf |

TABLE 2-continued

IPMP Control Information Table section

| Syntax | No. of bits | Mnemonic |
| --- | --- | --- |
|   descriptor_length | 24 | uimsbf |
|   for (i=0; i<N; i++) { | | |
|     descriptor () | | |
|   } | | |
|   isSigned | 1 | bslbf |
|   reserved | 7 | bslbf |
|   if (isSigned) | | |
|     Signature | 8 | ByteArray |
|     NumCerts | 8 | uimsbf |
|     for (i=0; i<numCerts; i++) { | | |
|       CertType | 8 | uimsbf |
|       Certificate | 8 | ByteArray |
|     } | | |
|   Verifying_Tool_ID | 128 | uimsbf |

TABLE 2-continued

IPMP Control Information Table section

| Syntax | No. of bits | Mnemonic |
| --- | --- | --- |
| } | | |
| CRC_32 | 32 | rpchof |
| } | | |

(Semantic Definition of Fields in IPMP Control Information Table Section)

table_id—This is an 8 bit field, which shall be always set to 0x02 as shown in table 1 above.

section_syntax_indicator—The section_syntax_indicator is a 1 bit field which shall be set to '1'.

section_length—This is a 20 bit field. It specifies the number of bytes of the section starting immediately following the section_length field, and including the CRC. The value in this field shall not exceed 1048573. The length is set to be a large value, because the following descriptors may contain Tool_Container_Descriptor that will be described later.

ipmp_control_info_version—This 5 bit field is the version number of the whole IPMP Control Information Table. The version number shall be incremented by 1 modulo 32 when a change in the information carried within the ipmp control info table occurs. When the current_next_indicator is set to '1', then the version_number shall be that of the currently applicable IPMP Control Information Table. When the current_next_indicator is set to '0', then the version_number shall be that of the next applicable IPMP Control Information Table.

current_next_indicator—A 1 bit indicator, which when set to '1' indicates that the IPMP Control Information Table sent is currently applicable. When the bit is set to '0', it indicates that the IPMP Control Information Table sent is not yet applicable and shall be the next IPMP Control Information Table to become valid.

section_number—This 8 bit field gives the number of this section. The section_number of the first section in the IPMP Control Information Table shall be 0x00. It shall be incremented by 1 modulo 256 with each additional section in the IPMP Control Information Table.

last_section_number—This 8 bit field specifies the number of the last section (that is, the section with the highest section_number) of the IPMP Control Information Table.

descriptor_length—This 16 bit field specifies the total length of the descriptors immediately following this field. ToolList_Descriptor should be following this field. Details of the descriptors are given in section 3.

isSigned—This 1 bit field indicates the presence of a signature in the IPMP Control Information table.

Signature—The signature of the entire IPMP Control Information including Tool List descriptor and Tool Container descriptor.

CertType—The type of certification mechanism being used.

NumCerts—The number of certificates included.

Certificate—The array of certificates.

Verifying_Tool_Id—The ID of the Tool that is required to verify the certificate(s). This may be the ID of the Terminal.

CRC_32—This is a 32 bit field that contains the CRC value that gives a zero output of the registers in the decoder defined in Annex B in [1] after processing the entire IPMP section.

(1.2 IPMP Control Information in Program Stream)

IPMP Control Info provides overall IPMP Information including Tool List Descriptor in Program Stream. It is presented as a PES packet when the stream_id value is specified value.

TABLE 3

IPMP Control Information

| Syntax | No. of bits | Mnemonic |
|---|---|---|
| IPMP_control_info_section() { | | |
|   packet_start_code_prefix | 24 | bslbf |
|   map_stream_id | 8 | uimsbf |
|   ipmp_control_info_length | 19 | uimsbf |
|   current_next_indicator | 1 | bslbf |
|   ipmp_control_info_version | 5 | uimsbf |
|   reserved | 7 | bslbf |
|   marker_bit | 16 | bslbf |
|   descriptor_length | 16 | uimsbf |
|   for (i=0; i<N; i++) { | | |
|     descriptor () | | |
|   } | | |

TABLE 3-continued

IPMP Control Information

| Syntax | No. of bits | Mnemonic |
|---|---|---|
|   isSigned | 1 | bslbf |
|   reserved | 7 | bslbf |
|   if (isSigned) | | |
|     Signature | 8 | ByteArray |
|     NumCerts | 8 | uimsbf |
|     for (i=0; i<numCerts; i++) { | | |
|       CertType | 8 | uimsbf |
|       Certificate | 8 | ByteArray |
|     } | | |
|     Verifying Tool_ID | 128 | uimsbf |
|   } | | |
|   CRC_32 | 32 | rpchof |
| } | | |

(Semantic Definition of Fields in IPMP Control Info)

packet_start_code_prefix—The packet_start_code_prefix is a 24-bit code. Together with the map_stream_id that follows it constitutes a packet start code that identifies the beginning of a packet. The packet_start_code_prefix is the bit string '0000 0000 0000 0000 0000 0001' (0x000001 in hexadecimal)

map_stream_id—This is an 8 bit field whose value is always 0x?? in hexadecimal.

ipmp_control_info_version—This 5 bit field is the version number of the whole IPMP Control Information. The version number shall be incremented by 1 modulo 32 when a change in the information carried within the ipmp control info occurs. When the current_next_indicator is set to '1', then the version_number shall be that of the currently applicable IPMP Control Information. When the current_next_indicator is set to '0', then the version_number shall be that of the next applicable IPMP Control Information.

ipmp_control_info_length—The ipmp_control_info_length is a 19 bit field indicating the total number of bytes in the ipmp_control_info immediately following this field. The maximum value of the field is 524288 (bytes).

current_next_indicator—A 1 bit field, which when set to '1' indicates that the IPMP Control Info sent is currently applicable. When the bit is set to '0', it indicates that the IPMP Control Info sent is not yet applicable and shall be the next one to become valid.

ipmp_control_info version—This 5 bit field is the version number of the whole IPMP Control Info. The version number shall be incremented by 1 modulo 32 whenever the definition of the IPMP Control Info changes. When the current_next_indicator is set to '1', then the ipmp_control_info_version shall be that of the currently applicable IPMP Control Info. When the current_next_indicator is set to '0', then the ipmp_control_info_version shall be that of the next applicable IPMP Control Info.

descriptor_length—The descriptor_length is a 16 bit field indicating the total length of the descriptors immediately following this field. ToolList_Descriptor should be following this field. Details of the descriptors are given in section 3.

marker_bit—A marker_bit is a 1 bit field that has the value '1'.

isSigned—This 1 bit field indicates the presence of a signature in the IPMP Control Information table. The following fields in the if bracket bears the same semantics as in the last section.

(2. New Descriptors)

Program and program element descriptors are structures which may be used to extend the definitions of programs and program elements. All descriptors have a format which begins with an 8 bit tag value. The tag value is followed by an 8 bit descriptor length and data fields. The invention defines new IPMP Tool List Descriptor to hold the IPMP tool list, IPMP Control Graph Descriptor to represent the overall IPMP structure, and IPMP Tool Container Descriptor to carry binary IPMP tool inside the content.

The following semantics apply to both descriptors defined in this invention as well as the existing descriptors in MPEG-2.

descriptor_tag—The descriptor_tag is an 8 bit field which identifies each descriptor. Its meaning is given in the following table. An 'X' in the TS or PS columns indicates the applicability of the descriptor to either the Transport Stream or Program Stream respectively. Five new descriptors are introduced in this invention.

TABLE 4

Program and program element descriptors

| descriptor_tag | TS | PS | Identification |
|---|---|---|---|
| 0 | n/a | n/a | Reserved |
| 1 | n/a | n/a | Reserved |
| 2 | X | X | video_stream_descriptor |
| 3 | X | X | audio_stream_descriptor |
| 4 | X | X | hierarchy_descriptor |
| ... | ... | ... | ... |
| 19 | X | X | IPMP Tool List Descriptor |
| 20 | X | X | IPMP Tool Information Descriptor |
| 21 | X | X | IPMP Parametric Descriptor |
| 22 | X | X | IPMP Tool Container Descriptor |
| 23 | X | X | IPMP Descriptor |
| 24-63 | n/a | n/a | ITU-T Rec. H.222.0|ISO/IEC 13818-1 Reserved |
| 64-255 | n/a | n/a | User Private | descriptor_length—The descriptor_length is an 8 bit field specifying the number of bytes of the descriptor immediately following descriptor_length field.

(2.1 IPMP Tool List Descriptor)

IPMP Tool List Descriptor includes a list of IPMP tools. It is used to specify all IPMP tools that should be used in order to play back the content.

TABLE 5

IPMP Tool List descriptor

| Syntax | No. of bits | Mnemonic |
|---|---|---|
| IPMPToolList_descriptor () { | | |
|   descriptor_tag | 8 | uimsbf |
|   descriptor_length | 16 | uimsbf |
|   numTools | 8 | uimsbf |
|   for ( i=0; i<numTools; i++) { | | |
|     IpmpTool_Descriptor () | | |
|   } | | |
| } | | |

IpmpTool_Descriptor( ) is defined in the following section.

(2.2 IPMP Tool Descriptor)

IPMP_Tool_Descriptor contains information for a logical IPMP Tool required by the Terminal. The logical tool may be one of the following:

1. A vendor-specific IPMP Tool specified by IPMP_ToolID,
2. One of a list of alternate IPMP Tools,
3. An IPMP Tool specified by a parametric description.

TABLE 6

IPMP Tool Info descriptor

| Syntax | No. of bits | Mnemonic |
|---|---|---|
| IPMPToolList_descriptor () { | | |
|   descriptor_tag | 8 | uimsbf |
|   descriptor_length | 16 | uimsbf |
|   isAltGroup | 1 | uimsbf |
|   isParametric | 1 | uimsbf |
|   Reserved (0b111111) | 6 | uimsbf |
|   IPMP_Tool_ID | 128 | uimsbf |
|   if (isAltGroup) { | | |
|     numAlternatives | 8 | uimsbf |
|     for (i=0; i< numAlternatives; i++) { | | |
|       Alt_IPMP_Tool_ID | 128 | uimsbf |
|     } | | |
|   } | | |
|   else if ( isParametric ) { | | |
|     parametricDescription | | ByteArray |
|   } | | |
| } | | |

(Semantic Definition of Fields in IPMP Tool Descriptor)

In the case of a list of alternate tools, the Terminal shall select an IPMP Tool from the list of alternate IPMP Tools. In the case of a parametric description of the IPMP Tool, the Terminal shall select an IPMP Tool that meets the criteria specified in the parametric description.

IPMP_ToolID—the identifier of the logical IPMP Tool required by the Terminal.

isAltGroup—IPMP_Tool contains a list of alternate IPMP Tools. In this case, IPMP_ToolID is an identifier for the list of alternate IPMP Tools, and the Terminal shall route information specified in the bitstream for IPMP_ToolID to the specific IPMP Tool instantiated by the Terminal.

numAlternates—the number of alternate IPMP Tools specified in IPMP_Tool[].

Alt_IPMP_ToolIDs—an array of the IDs of alternate IPMP Tools that can allow consumption of the content.

isparametric—IPMP_Tool contains a parametric description of an IPMP Tool. In this case, IPMP_ToolID is an identifier for the parametrically described IPMP Tool, and the Terminal shall route information specified in the bitstream for IPMP_ToolID to the specific IPMP Tool instantiated by the terminal.

(2.3 IPMP Tool Container Descriptor)

There are many cases whereby content itself carried the binary IPMP tool (light weighted). The terminal may retrieve the IPMP tool from the content, load it, instantiate it and immediately use it in order to play out the content.

In MPEG-4 IPMP extension, binary IPMP tools are carried in tool ES. However, in MPEG-2 context, it could be easier to carry the binary IPMP tool inside a newly defined IPMP Tool Container Descriptor. One implementation of a given tool is carried as the payload of one IPMP Tool Container, the representation format, packaging information and IPMP Tool ID of which is also specified in the container.

TABLE 7

IPMP Tool Container descriptor

| Syntax | No. of bits | Mnemonic |
|---|---|---|
| IPMPToolContainer_descriptor () { | | |
|   descriptor_tag | 8 | uimsbf |
|   descriptor_length | 16 | uimsbf |
|   IPMP_Tool_ID | 128 | uimsbf |
|   Tool_Format_ID | 32 | uimsbf |
|   Tool_Package_ID | 16 | uimsbf |
|   sizeofTool | 16 | uimsbf |
|   for ( i=0; i<sizeofTool; i++) { | | |
|     Toolbody | 8 | uimsbf |
|   } | | |
| } | | |

(Semantic Definitions of Fields in IPMP Tool Container Descriptor)

IPMP_Tool_ID—the ID of the Tool carried in this stream.

Tool_Format_ID—This is defined as 0x001 for a structurally described tool. Otherwise, the Tool_Format_ID indicates the Binary Representation of the Tool and is ned by a registration authority.

Note: A structurally described tool implies a description of the IPMP Tool in terms of a network of primitives that can be combined to provide some or all IPMP functionalities required for content consumption. For example, a DES decryption algorithm could be described as a sequence of opcodes calls receiving the ciphertext as input and providing the plaintext as output.

Tool_Package_Id indicates the details of the package of the Tool—examples are CAB or a Winzip self-install executable. Values are assigned by a registration authority.

(2.4 IPMP Control Graph Descriptor)

IPMP Control Graph descriptor contains description of the entire IPMP protection scheme. It associates IPMP tool with each individual stream under its protection.

TABLE 8

IPMP Control Graph descriptor

| Syntax | No. of bits | Mnemonic |
|---|---|---|
| IPMPControlGraph_descriptor () { | | |
|   descriptor_tag | 8 | uimsbf |
|   descriptor_length | 8 | uimsbf |
|   numProtectedPrograms | 8 | uimsbf |
|   if ( numProtectedPrograms>0 ) { | | |
|     program_number | 16 | uimsbf |
|     numProtectedStreams | 8 | uimsbf |
|     for ( i=0; i<numStreams; i++) { | | |
|       stream_type | 8 | uimsbf |
|       reserved | 3 | uimsbf |
|       elementary_PID | 13 | uimsbf |
|       ipmp_length | 16 | uimsbf |
|       for ( i=0; i<N; i++) { | | |
|         IPMP_Descriptor | | |
|       } | | |
|     } | | |
|   } | | |
|   else if (numProtectedPrograms==0) { | | |
|     numProtectedStreams | 8 | uimsbf |
|     for ( i=0; i<numProtectedStreams; i++) { | | |
|       stream_type | 8 | uimsbf |
|       elementary_stream_id | 8 | uimsbf |
|       ipmp_length | 16 | uimsbf |
|       for ( i=0; i<N; i++) { | | |

TABLE 8-continued

IPMP Control Graph descriptor

| Syntax | No. of bits | Mnemonic |
|---|---|---|
|         IPMP_Descriptor | | |
|       } | | |
|     } | | |
|   } | | |
| } | | |

(Semantic Definition of Fields in IPMP Control Graph Descriptor)

numProtectedPrograms—This 8 bit fields indicates how many programs are under IPMP protection scope. If the number is 0, it means it is a program stream. If it is greater than 0, it means it is a transport stream, and a for loop follows to trace into each program.

Transport Stream Case (numProtectedPrograms>0):

program_number—Program_number is a 16 bit field. It specifies the program that is under protection by IPMP. This field shall not take any single value more than once within one version of the IPMP Control Information.

ipmp_length—This is a 16 bit field. It specifies the number of bytes of the IPMP descriptors immediately following the ipmp_length field.

NumProtectedStreams—Specifies number of elementary streams (belonging to the above program) that are under the protection by IPMP.

stream_type—This is an 8 bit field specifying the type of program element carried within the packets with the PID whose value is specified by the elementary_PID. The values of stream_type are specified in table 11 described later.

elementary_PID—This is a 13 bit field specifying the PID of the Transport Stream packets which carry the associated program element. If there is a IPMP Descriptor following immediately after this elementary_PID, it means that this particular elementary stream is under the protection scope defined by this IPMP Descriptor.

Program Stream Case (numProtectedPrograms=0):

elementary_stream_id—The elementary_stream_id is an 8 bit field indicating the value of the stream_id field in the PES packet headers of PES packets in which this elementary stream is stored.

IPMP Descriptor is further defined below.

(2.5 IPMP Descriptor)

IPMP Descriptor specifies the IPMP protection at a particular scope. Including specification of control points, sequencing, IPMP tool IDs, etc.

TABLE 9

IPMP Descriptor

| Syntax | No. of bits | Mnemonic |
|---|---|---|
| IPMP_descriptor () { | | |
|   descriptor_tag | 8 | uimsbf |
|   descriptor_length | 8 | uimsbf |
|   IPMP_DescriptorID | 8 | uimsbf |
|   IPMP_ToolID | 128 | uimsbf |
|   numControlPoints | 8 | uimsbf |
|   for ( i=0; i<numControlPoints; i++) { | | |

TABLE 9-continued

IPMP Descriptor

| Syntax | No. of bits | Mnemonic |
|---|---|---|
|     controlPoint | 8 | uimsbf |
|     reserved | 6 | uimsbf |
|     secquenceCode | 2 | uimsbf |
|     if ( sequenceCode==0x1 ) { | | |
|         IPMP_DescriptorID | 8 | uimsbf |
|         controlPoint | 8 | uimsbf |
|     } | | |
|     if ( sequenceCode==0x2 ) { | | |
|         IPMP_DescriptorID | 8 | uimsbf |
|         controlPoint | 8 | uimsbf |
|     } | | |
|     OpaqueData | | ByteArray |
| } | | |

(Semantic Definitions of Fields in IPMP Descriptor)

IPMP_DescriptorID—a unique ID of this IPMP descriptor. This could be used to refer to this particular descriptor (protection scope).

IPMP_ToolID—Unique ID of the IPMP Tool that is protecting in this scope.

NumControlPoints—number of Control points at which the IPMP Tool is active.

controlPoint—value specifying the IPMP control point at which the IPMP Tool resides, and is one of the following values:

| Control Point | Description |
|---|---|
| 0x00 | No control point. |
| 0x01 | Control Point between the decode buffer and the decoder. |
| 0x02 | Control Point between the decoder and the composition buffer. |
| 0x03 | Control Point between the composition buffer and the compositor. | sequenceCode—value specifying the relation of the IPMP Tool to IPMP Tool(s) residing at the same control point, and is one of the following. If the sequenceCode is either 0x01 or 0x02, a IPMP Descriptor ID together with a controlPoint follows immediately, to specify which tool (instance) is this current IPMP tool preceding or following.

| Sequence Code | Description |
|---|---|
| 0x00 | IPMP Tool is not sequenced |
| 0x01 | IPMP Tool precedes another tool |
| 0x02 | IPMP Tool follows another tool |
| 0x03 | A logical "OR" of 0x01 and 0x02 |

OpaqueData--opaque data to control the IPMP Tool.

(3 New Streams)

Stream_id specifies the type and number of the elementary stream as defined by the table below. Stream_id 1111 1001 is assigned to IPMP Stream in this embodiment.

TABLE 10

Stream_id assignments

| stream_id | stream coding |
|---|---|
| 1011 1100 | program_stream_map |
| 1011 1101 | private_stream_1 |
| 1011 1110 | padding_stream |
| 1011 1111 | private_stream_2 |
| 110x xxxx | ISO/IEC 13818-3 or ISO/IEC 11172-3 audio stream number x xxxx |
| 1110 xxxx | ITU-T Rec. H.262\|ISO/IEC 13818-2 or ISO/IEC 11172-2 video stream number xxxx |
| 1111 0000 | ECM_stream |
| 1111 0001 | EMM_stream |
| 1111 1001 | ancillary_stream (IPMP Stream) |
| ... | ... |
| 1111 1100 ... 1111 1110 | reserved data stream |
| 1111 1111 | program_stream_directory |

TABLE 11

Stream type assignments

| Value | Description |
|---|---|
| 0x00 | ITU-T\|ISO/IEC Reserved |
| 0x01 | ISO/IEC 11172 Video |
| 0x02 | ITU-T Rec. H.262\|ISO/IEC 13818-2 Video or ISO/IEC 11172-2 constrained parameter video stream |
| 0x03 | ISO/IEC 11172 Audio |
| 0x04 | ISO/IEC 13818-3 Audio |
| ... | ... |
| 0x0F | IPMP Stream |
| 0x11-0x7F | ITU-T Rec. H.222.0\|ISO/IEC 13818-1 Reserved |
| 0x80-0xFF | User Private |

(3.1 IPMP Stream)

The IPMP Stream is a new elementary stream that is to carry IPMP information. Unlike MPEG-4 IPMP extension, where there can be many IPMP Elementary steams in one content, with each IPMP ES associated with one IPMP system, in MPEG-2, all IPMP information for all IPMP tools sitting on all control points are carried in a single IPMP Stream.

Hence, there is a need to indicate the clear destination in every piece of IPMP information in IPMP Stream.

It is defined in this invention that IPMP Stream should be a concatenation of IPMP info messages, with the syntax defined below:

TABLE 12

IPMP Info Message

| Syntax | No. of bits | Mnemonic |
|---|---|---|
| IPMP_info_message () { | | |
|     ipmp_descriptor_id | 8 | uimsbf |
|     control_point | 8 | uimsbf |
|     length_of_message | 16 | uimsbf |
|     for ( i=0; i<N; i++) { | | |
|         message | 8 | uimsbf |
|     } | | |
| } | | |

The ipmp_descriptor_id and control_point together clearly defines the destination of this IPMP_info_message. This message should be routed by the message router to the IPMP Tool defined in the corresponding ipmp descriptor sitting at the specified control_point.

(4 MPEG-2 IPMP Terminal)

IPMP Tool Manager and Message Router can be directly mapped from MPEG-4 IPMP Extension Terminal to MPEG-2 IPMP terminal.

Figure 3:
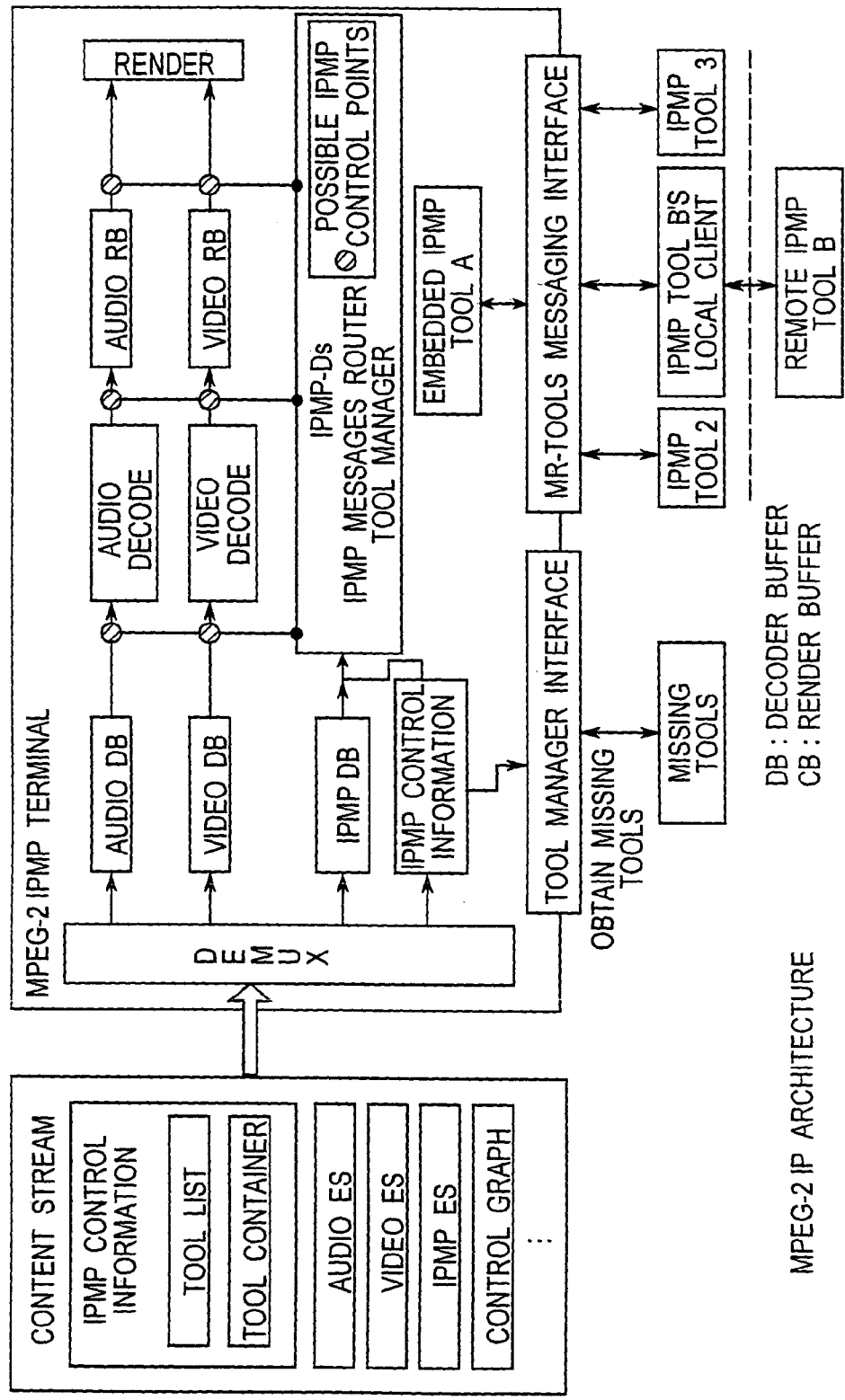
FIG. 3 shows a Diagram of MPEG-2 IPMP Terminal, in which "DB" denotes a decoder buffer and "RB" denotes a render buffer.

FIG. 3 shows the architecture of a MPEG-2 IPMP terminal.

(4.1 IPMP Tool Manager)

The IPMP Tool Manager is a conceptual entity in a given IPMP Terminal. Upon receipt of the Tool List, the Terminal should route the same to the IPMP Tool Manager for parsing and Tool retrieval. The Tool Manager also processes parametric descriptions, resolves alternative tools, and receives binary Tools that arrive in the Content.

The following steps detail the process of parsing and retreival of Tools in an MPEG-2 Terminal.

1. The IPMP Tool List Descriptor arrives in the IPMP Control Information Table in PSI and is routed to the Tool Manager.
2. The IPMP Tool Manager parses information for the IPMP Tools as per the syntax in clause 2.2.2.1.
3. The Tool Manager checks if the required Tools are available. For each unavailable Tool, an attempt to obtain the Tool may be made. How to obtain the missing tool is an implementation issue.
4. The IPMP Tool Manager is also responsible for parsing the IPMP Tool Container Descriptor and retrieving the binary IPMP Tool that is carried inside PSI.
5. The IPMP Tool Manager is further responsible for resolving parametric descriptions.

(4.2 IPMP Message Router)

All IPMP Tool Messages are routed through the Terminal. To represent this function, an entity called the Message Router is defined in the architecture. The MR connects and communicates with supported IPMP Tool(s). It thus abstracts the physical interface of one IPMP Tool from any other IPMP Tool that wishes to communicate with it. Message Routing is assumed to be instantaneous. In case of an MR error, an appropriate error status is returned by the MR. In all other cases, the MR is required to route, without a change in semantic meaning, information and responses as received.

Messaging interface can be mapped from MPEG-4 IPMP Extension without modification. However, there is no need to define a context ID for tool instances under MPEG-2. IPMP Descriptor ID together with control point should clearly define a specific tool instance running at a specific control point protecting a specific elementary stream.

(4.3 Mutual Authentication)

Tools that must communicate with one another or with the Terminal must do so in a way that meets the security requirements of the Tools and the Terminal. Tools must establish trust with the Terminal and possibly with one another to enable secure communication. Support for the establishment of a communication channel that reflects the nature of inter-tool trust can be accomplished via the use of secure, trusted authenticated channels.

Messages supporting the mutual authentication can be directly mapped from MPEG-4 IPMP extension to MPEG-2 framework.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The invention claimed is:

1. A content provider side apparatus for an intellectual property management and protection (IPMP) system for Moving Picture Expert Group-2 (MPEG-2) content distribution and protection, comprising:
   an encoder that encodes a content into an MPEG-2 content stream;
   an encryptor that encrypts the encoded MPEG-2 content stream using at least one IPMP tool;
   an IPMP tool list creator that creates an IPMP tool list of at least one IPMP tool used for encrypting the encoded content;
   a control graph creator that creates an IPMP control graph that indicates how the at least one IPMP tool protects the MPEG-2 content stream;
   a control information multiplexer that multiplexes IPMP control information including the IPMP tool list into an IPMP control information table for a transport stream; and
   a general multiplexer that multiplexes the encrypted content stream with the IPMP control information table, using an MPEG-2 system,
   an outputter that outputs the multiplexed encrypted content stream.

2. The content provider side apparatus according to claim 1, further comprising:
   a watermark section that embeds watermark information in the content using a watermarking tool.

3. The content provider side apparatus according to claim 1, further comprising:
   an IPMP tool container creator that creates an IPMP tool container to carry binary IPMP tools in the MPEG-2 content stream.

4. The content provider side apparatus according to claim 1, further comprising:
   a stream creator that creates an IPMP stream to carry time variant IPMP information that is to be sent to each individual IPMP tool instance during content consumption at a terminal side; and
   a stream multiplexer that multiplexes the IPMP stream into the MPEG-2 content stream.

5. A terminal side apparatus for an intellectual property management and protection (IPMP) system for Moving Picture Expert Group-2 (MPEG-2) content distribution and protection, comprising:
   a de-multiplexer that de-multiplexes IPMP control information including an IPMP tool list from an MPEG-2 content stream sent from a content provider;
   an IPMP tool list interpreter that interprets the IPMP tool list;
   an IPMP tool retriever that retrieves a missing IPMP tool based on the IPMP tool list;
   a control graph interpreter that interprets an IPMP control graph and obtains information relating an IPMP tool to a stream controlled by the IPMP tool at a control point; and
   an interactor that interacts with at least one IPMP tool through a pre-defined messaging interface at the control point.

6. The terminal side apparatus according to claim 5, further comprising:
   a watermarker that performs at least one of watermark retrieving and watermark embedding through the pre-defined messaging interface at the control point.

7. The terminal side apparatus according to claim 6, further comprising:
a description interpreter that interprets a parametric description of the IPMP tool list and alternative IPMP tools to make an IPMP tool selection based on an interpretation result.

8. The terminal side apparatus according to claim 5, further comprising:
a description interpreter that interprets a parametric description of the IPMP tool list and alternative IPMP tools to make an IPMP tool selection based on an interpretation result, and
an IPMP tool retriever that that retrieves binary IPMP tools from an IPMP tool container within IPMP control information to obtain an associated IPMP tool ID, an IPMP tool format ID and an IPMP tool package ID of each IPMP tool.

9. The terminal side apparatus according to claim 5, further comprising:
a router that routs a time variant IPMP related message to one of a specific IPMP tool instance and the terminal.

10. The terminal side apparatus according to claim 5, further comprising:
an IPMP tool implementer that implements at least one IPMP tool in an embedded MPEG-2 IPMP terminal.

11. The terminal side apparatus according to claim 5,
wherein the MPEG-2 content stream contains IPMP related streams including an IPMP control information stream and an IPMP stream, and
wherein the IPMP control information stream includes an IPMP tool list and an IPMP tool container.

12. The terminal side apparatus according to claim 5,
wherein MPEG-2 content streams are protected by IPMP tools, and contain information of IPMP tools including an IPMP tool ID, an IPMP tool location, an IPMP tool list and an IPMP tool control graph.

13. The terminal side apparatus according to claim 5,
wherein MPEG-2 content streams are protected by JPMP tools, and
wherein the IPMP tools are carried in the MPEG-2 content streams by a defined IPMP tool container.

14. The terminal side apparatus according to claim 5,
wherein MPEG-2 content streams are protected by a plurality of IPMP tools, and a plurality of missing IPMP tools in the terminal can be retrieved from a specified location.

15. The terminal side apparatus according to claim 5,
wherein MPEG-2 content streams are protected by a plurality of IPMP tools, and a plurality of IPMP tools are pre-implemented in the terminal.

16. The terminal side apparatus according to claim 5,
wherein a protected MPEG-2 stream is processed first by using IPMP information carried in the same MPEG-2 stream, the IPMP information including an IPMP tool list, an IPMP control graph, an IPMP tool container, and an IPMP stream.

17. The terminal side apparatus according to claim 5,
wherein a protected MPEG-2 stream is processed first by interpreting IPMP control information carried in the protected MPEG-2 stream, parsing an IPMP tool list, interpreting an IPMP control graph, retrieving missing IPMP tools, and applying IPMP tools to audio and video streams at the control point.

18. The terminal side apparatus according to claim 5,
wherein a protected MPEG-2 stream is processed first by a conceptual IPMP manager to obtain IPMP tools and apply the obtained IPMP tools to associated audio and video streams.

19. A content provider side apparatus for an intellectual property management and protection (IPMP) system for Moving Picture Expert Group-2 (MPEG-2) content distribution and protection, comprising:
an encoder that encodes a content into an MPEG-2 content stream;
an encryptor that encrypts the encoded MPEG-2 content stream using at least one IPMP tool;
an IPMP tool list creator that creates an IPMP tool list of at least one IPMP tool used for encrypting the encoded content;
a control graph creator that creates an IPMP control graph that indicates how the at least one IPMP tool protects the MPEG-2 content stream;
a control information multiplexer that multiplexes IPMP control information including the IPMP tool list into an IPMP control information PES packet for a program stream; and
a general multiplexer that multiplexes the encrypted content stream with the IPMP control information PES packet, using an MPEG-2 systems,
an outputter that outputs the multiplexed encrypted content stream.

20. The content provider side apparatus according to claim 19, further comprising:
a watermark section that embeds watermark information in the content using a watermarking tool.

21. The content provider side apparatus according to claim 19, further comprising:
an IPMP tool container creator that creates an IPMP tool container to carry binary IPMP tools in the MPEG-2 content stream.

22. The content provider side apparatus according to claim 19, further comprising:
a stream creator that creates an IPMP stream to carry time variant IPMP information that is to be sent to each individual IPMP tool instance during content consumption at a terminal side; and
a stream multiplexer that multiplexes the IPMP stream into the MPEG-2 content stream.

* * * * *

UNITED STATES PATENT AND TRADEMARK OFFICE
CERTIFICATE OF CORRECTION

PATENT NO. : 7,467,297 B2  Page 1 of 1
APPLICATION NO. : 10/399049
DATED : December 16, 2008
INVENTOR(S) : M. Ji et a.

It is certified that error appears in the above-identified patent and that said Letters Patent is hereby corrected as shown below:

On the Title Page, at Item (30), Foreign Application Priority Data, the following data was omitted and should be included:
--September 3, 2001   Japan   2001-265908--.

At column 17, line 38 (claim 13, line 1) of the printed patent, "JPMP" should be --IPMP--.

At column 18, line 34 (claim 19, line 21) of the printed patent, "systems" should be --system--.

Signed and Sealed this

Twenty-eighth Day of April, 2009

JOHN DOLL
*Acting Director of the United States Patent and Trademark Office*